United States Patent
Lundberg et al.

(10) Patent No.: US 8,356,529 B2
(45) Date of Patent: Jan. 22, 2013

(54) HYDRAULIC CONTROL SYSTEMS FOR DUAL CLUTCH TRANSMISSIONS

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 761 days.

(21) Appl. No.: 12/556,477

(22) Filed: Sep. 9, 2009

(65) Prior Publication Data

US 2011/0056316 A1 Mar. 10, 2011

(51) Int. Cl.
*F16H 3/38* (2006.01)
*B60W 10/02* (2006.01)
*B60W 10/10* (2006.01)
*B60W 10/00* (2006.01)
*F16D 67/00* (2006.01)

(52) U.S. Cl. ............................ 74/340; 192/3.58; 477/79

(58) Field of Classification Search .................. 74/329, 74/335, 340, 473.11; 192/3.57, 3.58, 3.63; 477/70, 79, 180
See application file for complete search history.

(56) References Cited

U.S. PATENT DOCUMENTS

| | | | | |
|---|---|---|---|---|
| 6,568,515 B2* | 5/2003 | Harries | ................. | 192/3.58 |
| 6,658,951 B2* | 12/2003 | Harries | ................. | 74/336 R |
| 6,883,394 B2* | 4/2005 | Koenig et al. | ................. | 74/335 |
| 6,898,992 B2* | 5/2005 | Koenig et al. | ................. | 74/335 |
| 6,953,417 B2* | 10/2005 | Koenig | ................. | 477/181 |
| 7,127,961 B2* | 10/2006 | Braford et al. | ................. | 74/340 |
| 7,155,993 B2* | 1/2007 | Koenig et al. | ................. | 74/331 |
| 7,300,375 B2* | 11/2007 | Petrzik | ................. | 475/119 |
| 7,395,908 B2* | 7/2008 | Hegerath et al. | ................. | 192/3.58 |
| 7,401,689 B2* | 7/2008 | Hegerath et al. | ................. | 192/3.58 |
| 7,410,438 B2* | 8/2008 | Moehlmann et al. | ................. | 475/116 |
| 7,464,618 B2* | 12/2008 | Mohlmann et al. | ................. | 74/346 |
| 7,752,935 B2* | 7/2010 | Vernacchia et al. | ................. | 74/335 |
| 7,823,473 B2* | 11/2010 | Uberti et al. | ................. | 74/335 |
| 7,938,037 B2* | 5/2011 | John et al. | ................. | 74/335 |
| 8,206,265 B2* | 6/2012 | Maten et al. | ................. | 477/130 |
| 8,216,110 B2* | 7/2012 | Katakura et al. | ................. | 477/79 |
| 8,225,687 B2* | 7/2012 | Lundberg et al. | ................. | 74/330 |
| 2009/0151495 A1* | 6/2009 | Garabello et al. | ................. | 74/473.11 |
| 2010/0096232 A1* | 4/2010 | Buchanan et al. | ................. | 192/3.61 |
| 2011/0056315 A1* | 3/2011 | Lundberg et al. | ................. | 74/473.11 |

FOREIGN PATENT DOCUMENTS

DE 10134115 A1 1/2003

* cited by examiner

*Primary Examiner* — Troy Chambers
*Assistant Examiner* — Michael Gonzalez

(57) ABSTRACT

The present invention comprehends a plurality of embodiments of a hydraulic control system for various configurations of dual clutch transmissions. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

6 Claims, 9 Drawing Sheets

HYDRAULIC CONTROL SYSTEMS FOR DUAL CLUTCH TRANSMISSIONS

FIELD

The present disclosure relates to hydraulic control systems and more particularly to hydraulic control systems and their components for dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch losses and the lack of a torque converter.

There are, however, design considerations unique to dual clutch transmissions. For example, because of heat generated during clutch slip, the input clutches must be of relatively large size. Furthermore, such heat generation typically requires correspondingly larger and more complex cooling components capable of dissipating relatively large quantities of heat. Finally, because such transmissions typically have many sets of axially aligned, meshing gears, their overall length may limit their use to certain vehicle designs.

Control of the input clutches and selection and engagement of a particular gear by translation of a synchronizer and associated positive clutch is typically achieved by a hydraulic control system. Such a system, itself under the control of an electronic transmission control module (TCM), includes hydraulic valves and actuators which engage the synchronizers and gear clutches. Optimum operating efficiency and thus fuel efficiency and minimal heat generation can be achieved by designing such hydraulic control systems to exhibit low leakage and positive control characteristics. The present invention is so directed.

SUMMARY

The present invention comprehends a plurality of embodiments of a hydraulic control system for two configurations of a dual clutch transmission having two or three countershafts, a third, idler shaft and four or five shift rails and hydraulic actuators. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

The various embodiments define two essentially independent control systems supplied with hydraulic fluid through two independently operating valves. The two independent control systems are associated with respective transmission countershafts and, generally speaking, one countershaft is associated with the even-numbered gears (second, fourth, etc.) and the other countershaft is associated with the odd-numbered gears (first, third, etc.). When the transmission is operating in a normal ascending or descending gear selection sequence, this configuration permits pre-staging or pre-selection of a gear associated with one countershaft while a gear associated with the other countershaft is engaged and transmitting torque. Furthermore, if a component or components associated with one countershaft fail, the other countershaft and the alternating (i.e., first, third, fifth) selection of gear ratios it provides will still be fully operational—a highly desirable failure mode.

The hydraulic control systems according to the present invention are less complex and expensive relative to competing systems, provide improved control through interconnected logic valves which reduce the likelihood of engaging a wrong or multiple gears and provide reduced energy consumption by allowing shut-down of portions of the control system during steady state operation. Certain embodiments of the control system utilize pairs of pressure or flow control valves to control pressure on both sides of shift actuator pistons which provides better control and improved shifts.

Thus it is an object of the present invention to provide a hydraulic control system for a dual clutch automatic transmission.

It is a further object of the present invention to provide a hydraulic control system for a dual clutch transmission having a plurality of spool or logic valves and hydraulic actuators.

It is a still further object of the present invention to provide a hydraulic control system for a dual clutch transmission having a plurality of two position solenoid valves, spool valves and hydraulic actuators.

It is a still further object of the present invention to provide a hydraulic control system for a dual clutch transmission having a plurality of flow or pressure control valves, two position solenoid valves, logic or spool valves and hydraulic actuators.

It is a still further object of the present invention to provide a hydraulic control system for a dual clutch transmission comprising two essentially independent hydraulic systems, each associated with a respective transmission countershaft.

It is a still further object of the present invention to provide a hydraulic control system for a dual clutch transmission having a pair of input clutches associated with a pair of concentric input shafts and a pair of countershafts.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
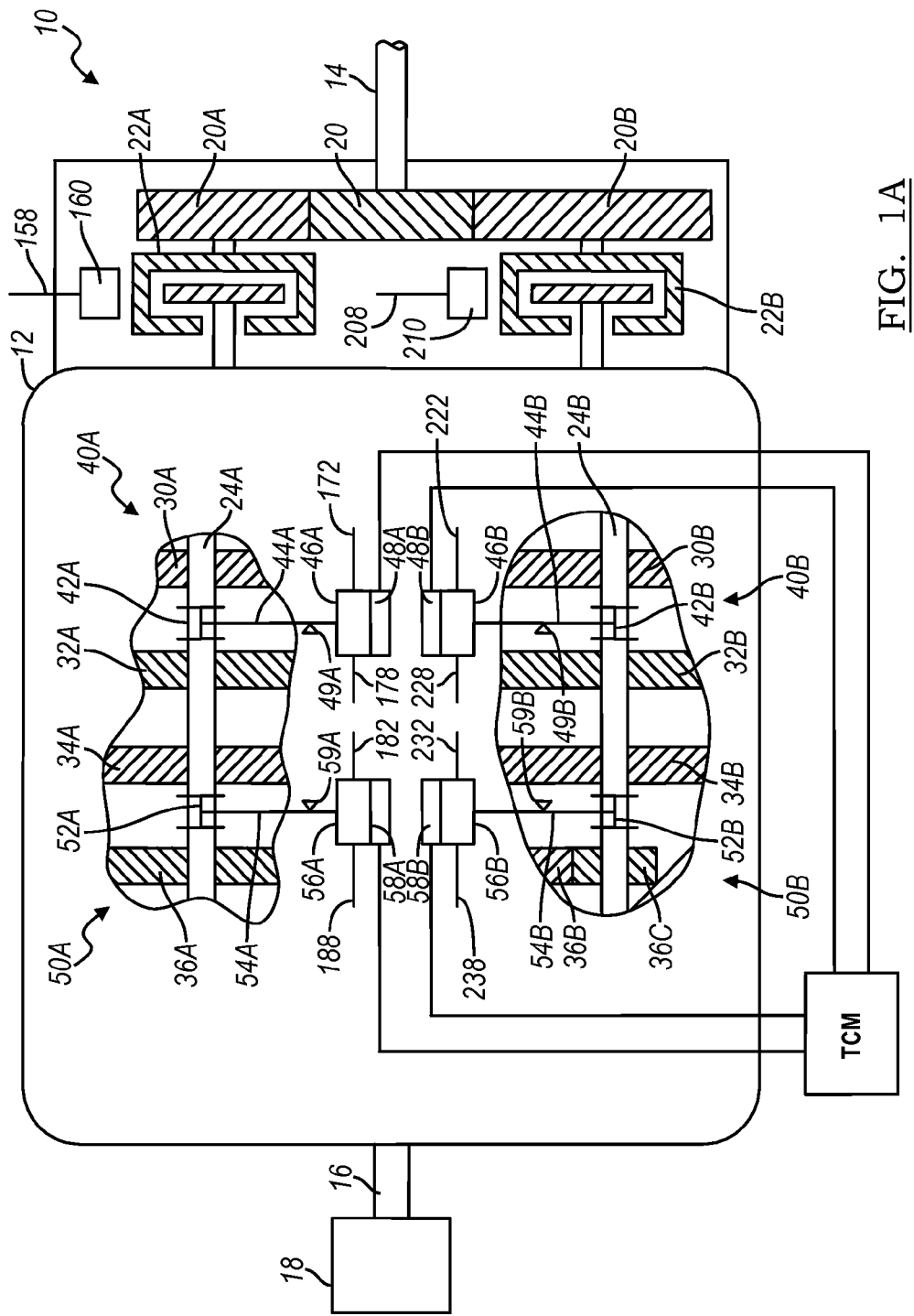
FIG. 1A is a pictorial view of an exemplary dual clutch automatic transmission with portions broken away incorporating a hydraulic control system according to the present invention having four shift actuator assemblies.

With reference now to FIG. 1A, an exemplary dual clutch automatic transmission having four shift actuators and incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14 which receives motive power from a prime mover (not illustrated) such as an internal combustion gas or Diesel engine or a hybrid or electric power plant and a single or double output shaft 16 which is coupled to a single or double output assembly 18 which may include, for example, propshafts, differential assemblies and drive axles. The input shaft 14 is coupled to and drives an input drive gear 20 which is in constant mesh with and drives a pair of driven gears, a first driven gear 20A and a second driven gear 20B. A variety of torque transmitting, rotating devices can be used and are within the scope of this invention. The driven gears 20A and 20B, in turn, drive a pair of dry input clutches, a first input clutch 22A and a second input clutch 22B which are mutually exclusively engaged to provide drive torque to a respective pair of layshafts or countershafts, a first countershaft shaft 24A and a second countershaft 24B.

Freely rotatably disposed about each of the countershafts 24A and 24B are a plurality of helical or spur gears (not illustrated) which are in constant mesh with helical or spur gears which are secured to and rotate with the output shaft 16. A first driven gear on the output shaft 16 meshes with both a drive gear 30A on the first countershaft 24A and a drive gear 30B on the second countershaft 24B. A second driven gear on the output shaft 16 meshes with both a drive gear 32A on the first countershaft 24A and a drive gear 32B on the second countershaft 24B. A third driven gear on the output shaft 16 meshes with both a drive gear 34A on the first countershaft 24A and a drive gear 34B on the second countershaft 24B. A fourth driven gear in the output shaft 16 meshes with both a drive gear 36A on the first countershaft 24A and an idler gear 36B. The idler gear 36B, in turn, meshes with a drive gear 36C the second countershaft 24B to provide torque reversal and thus reverse gear. Other numbers of gear meshes are within the scope of this invention.

Disposed between each adjacent pair of gears on each countershaft 24A and 24B is a shift actuator and synchronizer clutch assembly. Each shift actuator and synchronizer clutch assembly, in accordance with conventional practice, includes a synchronizer assembly which, when activated, synchronizes the speed of a gear to that of the countershaft and a positive clutch, such as a dog or face clutch, which positively connects or couples the gear to the countershaft. Thus, between the gears 30A and 32A on the first countershaft 24A is a first shift actuator and synchronizer clutch assembly 40A having a double, i.e., back-to-back, synchronizer clutch 42A which selectively and exclusively synchronizes and engages one of the gears 30A and 32A to the first countershaft 24A. The first synchronizer clutch 42A is bi-directionally translated by a first shift rail and fork assembly 44A which, in turn, is translated by a first shift actuator assembly 46A. The real time linear position of the first synchronizer clutch 42A and the first shift rail and fork assembly 44A is sensed by a first linear position sensor 48A which preferably provides a continuous, i.e., proportional, output to a transmission control module TCM indicating the present position of the first synchronizer clutch 42A.

Between the gears 34A and 36A on the first countershaft 24A is a second shift actuator and synchronizer clutch assembly 50A having a double, i.e., back-to-back, synchronizer clutch 52A which selectively and exclusively synchronizes and engages one of the gears 34A and 36A to the first countershaft 24A. The second synchronizer clutch 52A is bi-directionally translated by a second shift rail and fork assembly 54A which, in turn, is translated by a second shift actuator assembly 56A. The real time linear position of the second synchronizer clutch 52A and the second shift rail and fork assembly 54A is sensed by a second linear position sensor 58A which preferably provides a continuous, i.e., proportional, output to the transmission control module TCM indicating the present position of the second synchronizer clutch 52A.

Between the gears 30B and 32B on the second countershaft 24B is a third shift actuator and synchronizer clutch assembly 40B having a double, i.e., back-to-back, synchronizer clutch 42B which selectively and exclusively synchronizes and engages one of the gears 30B and 32B to the second countershaft 24B. The third synchronizer clutch 42B is bi-directionally translated by a third shift rail and fork assembly 44B which, in turn, is translated by a third shift actuator assembly 46B. The real time linear position of the third synchronizer clutch 42B and the third shift rail and fork assembly 44B is sensed by a third linear position sensor 48B which preferably provides a continuous, i.e., proportional, output to the transmission control module TCM indicating the present position of the third synchronizer clutch 42B.

Between the gears 34B and 36C on the second countershaft 24B is a fourth shift actuator and synchronizer clutch assembly 50B having a double, i.e., back-to-back, synchronizer clutch 52B which selectively and exclusively synchronizes and engages one of the gears 34B and 36C to the second countershaft 24B. The fourth synchronizer clutch 52B is bi-directionally translated by a fourth rail and fork assembly 54B which, in turn, is translated by a fourth actuator assembly 56B. The real time linear position of the fourth synchronizer clutch 52B and the fourth shift rail and fork assembly 54B is sensed by a fourth linear position sensor 58B which preferably provides a continuous, i.e., proportional, output to the transmission control module TCM indicating the present position of the fourth synchronizer clutch 52B. It should be appreciated that the linear position sensors 48A, 48B, 58A and 58B may be replaced with two or three position switches or other logic control with system characterization for determining actuator and shift rail position and state.

Additionally, a detent mechanism may be employed with each of the shift assemblies to assist in obtaining or maintaining a given gear or speed ratio once it is selected or assist in obtaining or maintaining the synchronizer clutch in neutral. i.e., an unengaged position. Thus, a first detent assembly 49A may be operatively associated with the first shift actuator and synchronizer clutch assembly 40A. A second detent assembly 59A may be operatively associated with the second shift actuator and synchronizer clutch assembly 50A. A third detent assembly 49B may be operatively associated with the third shift actuator and synchronizer clutch assembly 40B and a fourth detent assembly 59B may be operatively associated with the fourth shift actuator and synchronizer clutch assembly 50B.

Figure 1B:
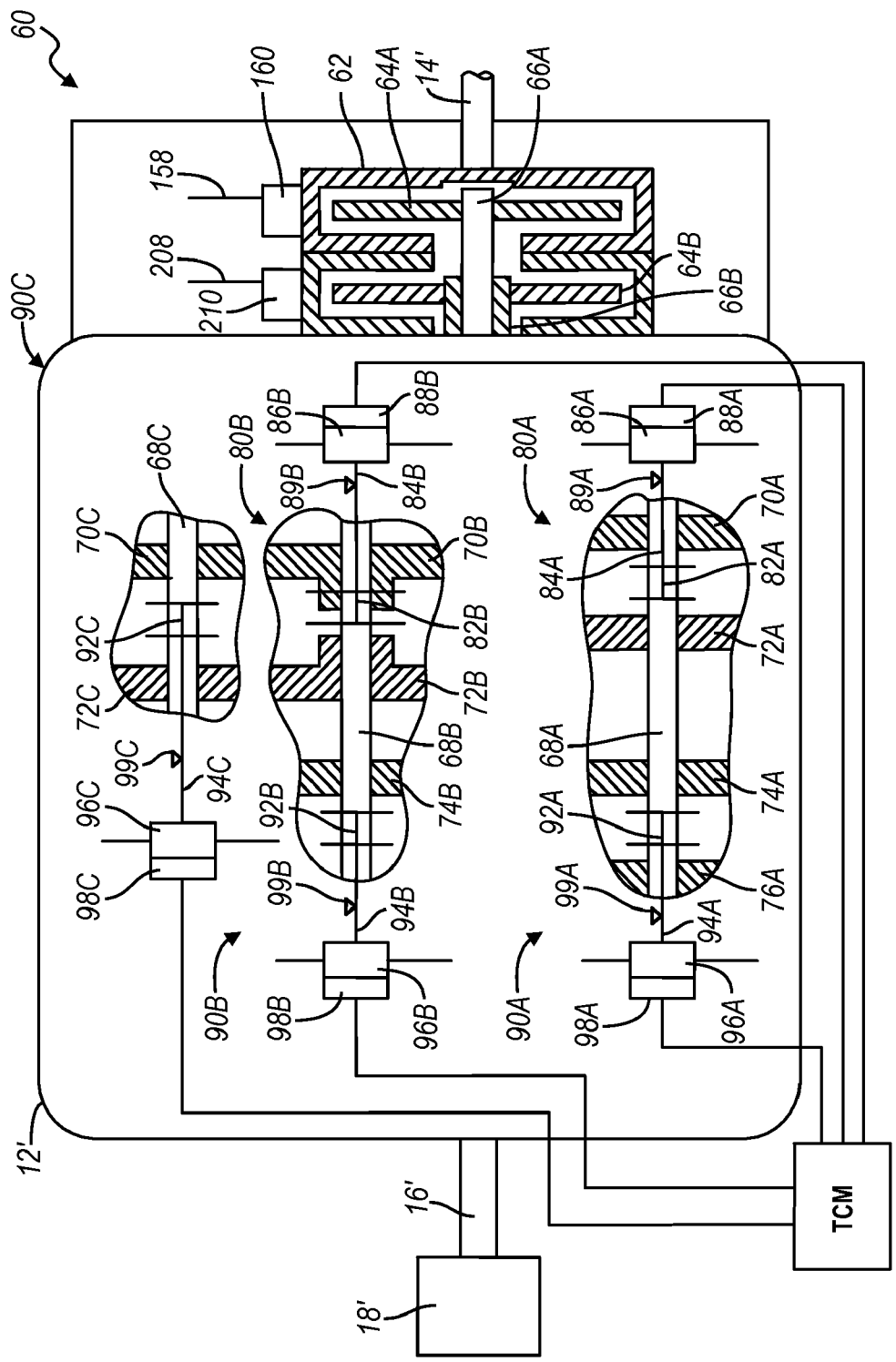
FIG. 1B is a pictorial view of an exemplary dual clutch automatic transmission with portions broken away incorporating a hydraulic control system according to the present invention having five shift actuator assemblies.

With reference to FIG. 1B, a second exemplary dual clutch automatic transmission incorporating the present invention is illustrated and generally designated by the reference number 60. The dual clutch transmission 60 includes a typically cast, metal housing 12' which encloses and protects the various components of the transmission 60. The housing 12' includes a variety of apertures, passageways, shoulders and flanges (not illustrated) which position and support the components of the transmission 60. The transmission 60 includes an input shaft 14' which receives motive power from a prime mover (not illustrated) such as an internal combustion gas or Diesel engine or a hybrid or electric power plant and a single or double output shaft 16' which drives a final drive assembly 18' which may include a propshaft, a differential and drive axles. The input shaft 14' is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the sixth driven gear 72B to the second countershaft 68B. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages the seventh driven gear 72C to the third countershaft 68C or couples the driven gear 72C to the drive gear 70C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It should be appreciated that the linear position sensors 88A, 88B, 98A, 98B and 98C may be replaced with two or three position switches or other logic control with system characterization for determining actuator and shift rail position and state.

Additionally, a detent mechanism may be employed with each of the shift assemblies to assist in obtaining and maintaining a gear or speed ratio once it is selected and assist in obtaining and maintaining the synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, all deemed to be within the scope of this invention may, for example, include six forward speeds (or gears) and one or two reverse speeds (or gears) or five forward speeds and one or two reverse speeds.

It should be understood that while the present invention is directed to hydraulic control systems for dual clutch transmissions, such systems are typically controlled by one or more microprocessors contained in a transmission control module TCM. The transmission control module TCM includes a plurality of inputs which receive data from, for example, the linear position sensors, memory, software and a plurality of outputs which control and modulate, for example, the positions of the clutches, shift rails and logic solenoid valves.

Just, as noted above, the transmission may include various numbers of forward and reverse speeds or gear ratios, various embodiments of the transmission may include four shift actuators and shift rails or five shift actuators and shift rails and single or double synchronizer clutch assemblies as described herein. Embodiments having four shift rails include four double synchronizer clutch assemblies, typically disposed in pairs on two countershafts, as illustrated in conjunction with the transmission 10 in FIG. 1A. Embodiments having five shift rails include two single and three double synchronizer clutch assemblies disposed on three countershafts, as illustrated in conjunction with the transmission 60 in FIG. 1B. In addition to various sensor configurations, it should be understood that various actuator piston configurations, which depend upon the cost and performance or the system, are deemed to be within the scope of the present invention.

Figure 2A:
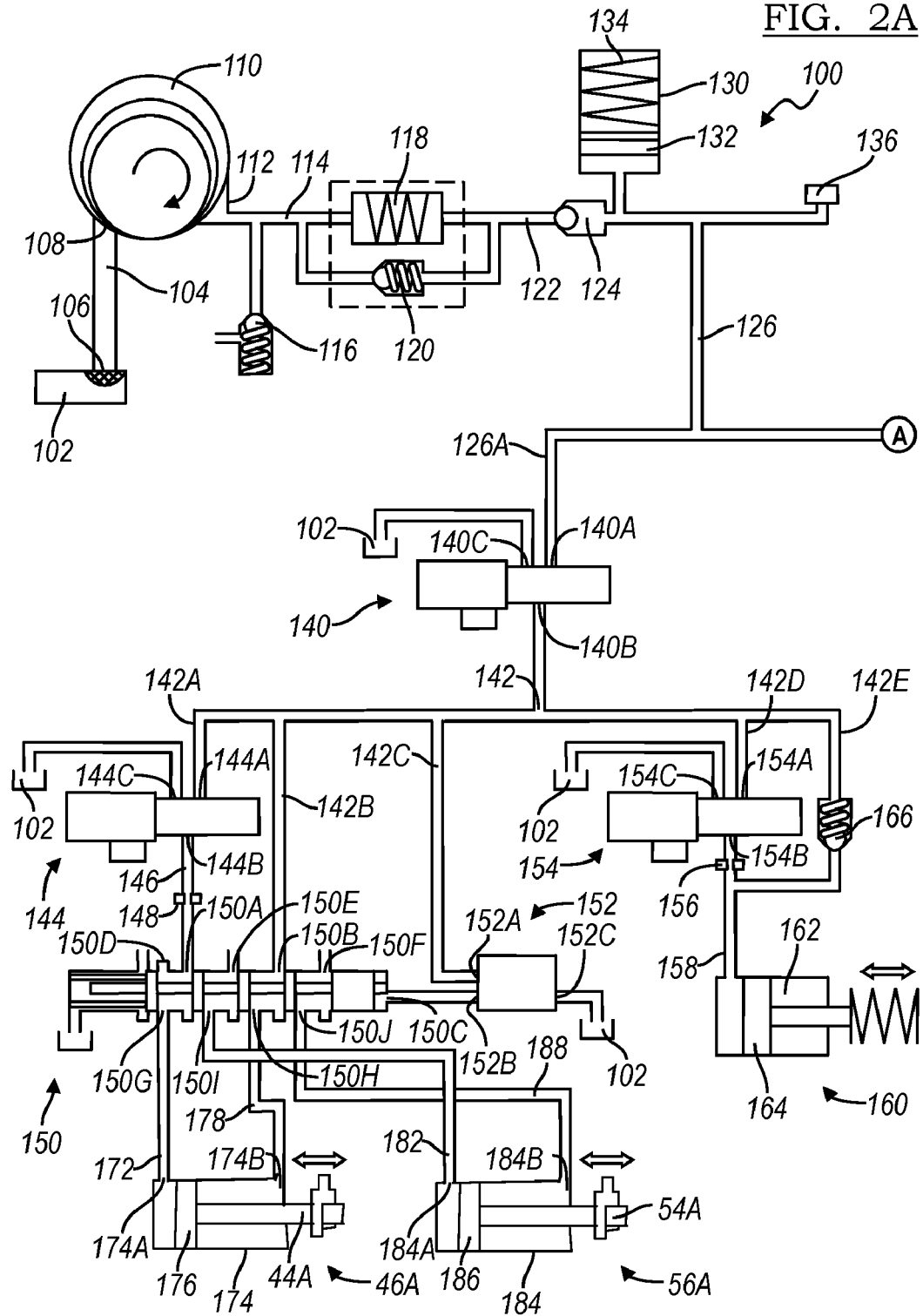
FIGS. 2A and 2B are schematic flow diagrams of a first embodiment of a hydraulic control system according to the present invention for a dual clutch automatic transmission.
Figure 2B:
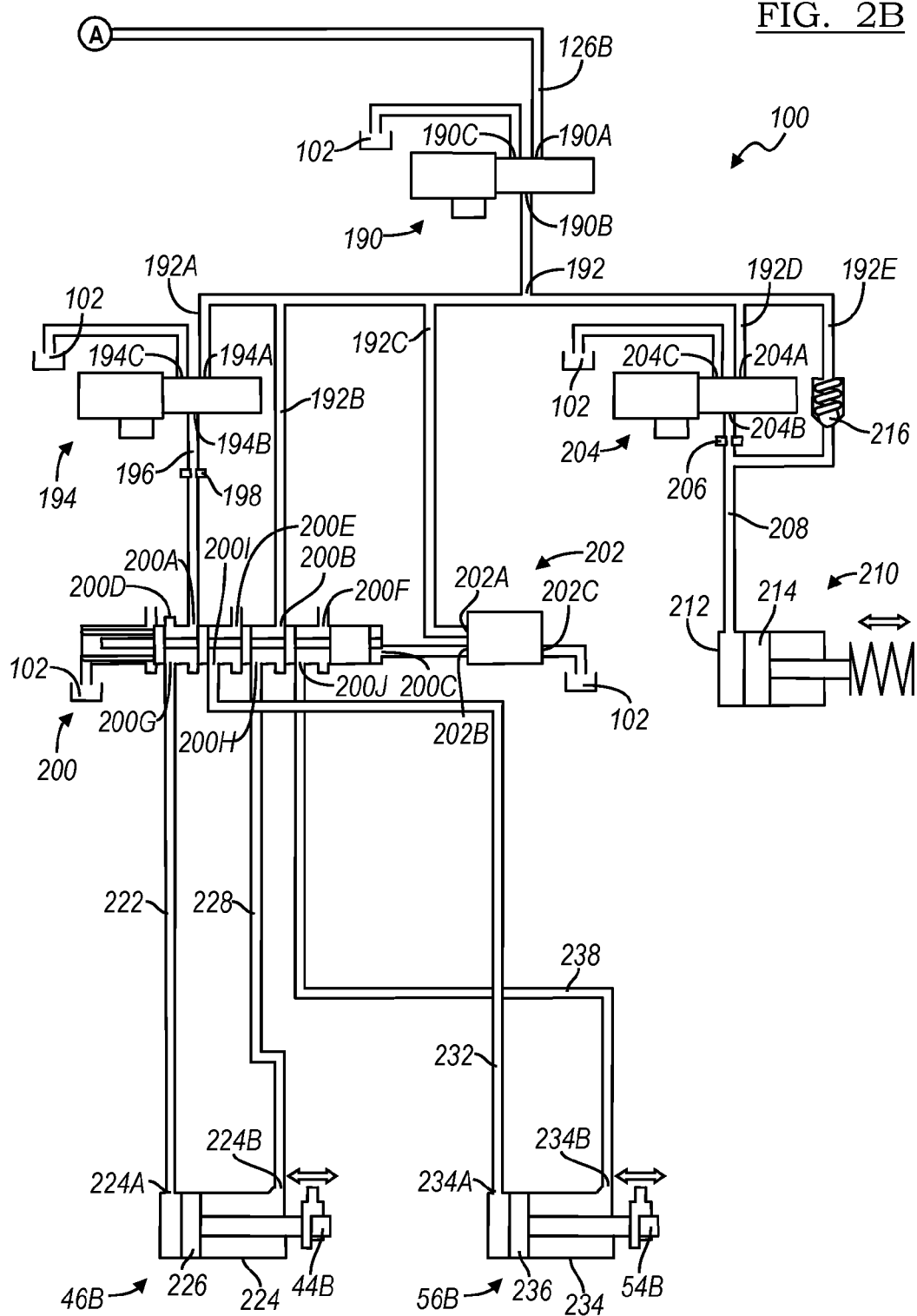

Referring now to FIGS. 1A, 2A and 2B, a first embodiment of a hydraulic control system for the dual clutch automatic transmission 10 described above is illustrated and designated by the reference number 100. The hydraulic control system 100 includes a sump 102 to which hydraulic fluid returns and collects from various components and regions of the automatic transmission 10. A suction line 104 which may include a filter 106 communicates with the inlet port 108 of an engine driven or electric pump 110 which may be, for example, a gear pump, a vane pump, a gerotor pump or other positive displacement pump. An outlet port 112 of the electric pump 110 provides hydraulic fluid under pressure in a supply line 114 to a spring biased blow-off safety valve 116 and to a pressure side filter 118 which is disposed in parallel with a spring biased check valve 120.

The safety valve 116 is set at a relatively high predetermined pressure and if the pressure in the supply line 114 exceeds this pressure, the safety valve 116 opens momentarily to relieve and reduce it. If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 100, the check valve 120 opens to allow hydraulic fluid to bypass the filter 118. A second check valve 124, in the outlet line 122, is configured to maintain hydraulic pressure in a main supply line 126 and to prevent backflow through the pump 110. The main supply line 126 supplies pressurized hydraulic fluid to an accumulator 130 having a piston 132 and a biasing compression spring 134. The accumulator 130 may be one of many other designs including a gas filled piston accumulator. The accumulator 130 stores pressurized hydraulic fluid and supplies it to the main supply line 126, to a main or system pressure sensor 136 and to the other components of the control system 100 thereby eliminating the need for an engine driven pump or for the electric pump 110 to run continuously. The main pressure sensor 136 reads the delivered hydraulic system pressure in real time and provides this data to the transmission control module TCM.

It should be appreciated that the other embodiments of the hydraulic control system according to the present invention preferably include the same hydraulic supply, filtration and control components just described. Accordingly, these components will be only briefly described in connection with the subsequent figures and embodiments, it being understood that the above description may be referenced to provide details of these components.

In the first embodiment of FIGS. 2A and 2B, the main supply line 126 branches or bifurcates into a first main supply line 126A and a second main supply line 126B. This initial bifurcation, before any gear or clutch selection or activation components, essentially splits the control system 100, as well as the second and third embodiments, into two separate control systems. This is advantageous from a control standpoint since if only one side of the transmission 10 is active, it is possible for only the clutch and gears on one countershaft to be selected at any given time, without activation of the other side of the transmission. This is also desirable from a failure mode standpoint since failure of a component on one side of the transmission will affect only that side of the transmission and the control system, the clutch and gears on the other side of the transmission will, in all likelihood, still be available to provide limited operation and mobility.

The first main supply line 126A communicates with an inlet port 140A of a first electric pressure control solenoid valve 140 for the first gearbox, i.e., one half of the transmission 10 associated with the layshaft or countershaft 24A, which provides, for example, the odd-numbered gears: first, third, fifth and seventh. The first pressure control solenoid valve 140 also includes an outlet port 140B that communicates with the inlet port 140A when the first control valve 140 is activated or energized and an exhaust port 140C that communicates with the outlet port 140B when the first control valve 140 is inactive or de-energized. The exhaust port 140C is connected to the sump 102. It should be understood that throughout the control system 100 the exhaust ports may be connected directly to the sump 102 or, if desired, they may be connected to a common exhaust backfill circuit (not illustrated). The outlet port 140B communicates with a first manifold 142 having five branches. A first branch 142A of the first manifold 142 communicates with an inlet port 144A of a first pressure or flow control solenoid valve 144. When the pressure or flow control valve 144 is activated or energized, the inlet port 144A is in fluid communication with an outlet port 144B; when the pressure or flow control valve 144 is inactive or de-energized, the outlet port 144B is in fluid communication with an exhaust port 144C. The outlet port 144B is connected through a line 146 having a flow restricting orifice 148 to a first inlet port 150A of a first two position spool or logic valve 150. It should be understood that the incorporation or omission of flow restricting orifices in all the hydraulic lines of the hydraulic control system 100 and the other two embodiments is within the scope of this invention. The locations and sizes of such flow restricting orifices are based on operational, software and algorithm requirements.

A second branch 142B of the first manifold 142 leads directly to a second inlet port 150B of the first logic valve 150. The first logic valve 150 also includes three exhaust ports 150D, 150E and 150F interleaved with the first inlet port 150A and the second inlet port 150B. The three exhaust ports 150D, 150E and 150F communicate with the sump 102, although such connections are not illustrated for reasons of clarity. A third branch 142C of the first manifold 142 connects to an inlet port 152A of a first two position (on-off) solenoid valve 152. The outlet port 152B of the first two position solenoid valve 152 communicates with a control port 150C at the end of the first logic valve 150. When the two position solenoid valve 152 is activated or energized, pressurized hydraulic fluid is supplied to the control port 150C of the first logic valve 150, translating the spool to the left as illustrated in FIG. 2A; when the two position solenoid valve 152 is inactive or de-energized, hydraulic fluid is exhausted from the first logic valve 150, through the outlet port 152B and out an exhaust port 152C to the sump 102, allowing the spool to translate to the right. A fourth branch 142D of the first manifold 142 communicates with an inlet port 154A of a first electric pressure or flow clutch control solenoid valve 154. The first clutch control solenoid valve 154 also includes an outlet port 154B and an exhaust port 154C which communicates with the sump 102.

When the clutch control solenoid valve 154 is activated or energized, pressurized hydraulic fluid is provided through a flow control orifice 156 in a line 158 to a first clutch piston and cylinder assembly 160. Slidably disposed within a cylinder 162 is a single acting piston 164 which translates to the right in FIG. 2A under hydraulic pressure to engage the first input clutch 22A, illustrated in FIG. 1A. When the first clutch control solenoid valve 154 is de-energized, the inlet port 154A is closed and hydraulic fluid from the cylinder 162 passes from the outlet port 154B to the exhaust port 154C and into the sump 102. A fifth branch 142E of the first manifold 142 communicates with the output of a first clutch pressure limit control valve 166. If pressure within the first clutch piston and cylinder assembly 160 exceeds a predetermined pressure determined by the pressure control solenoid 140, the first pressure limit control valve 166 opens to relieve and reduce the pressure.

Returning to the first spool or logic valve 150, it also includes a first outlet port 150G which communicates through a line 172 to a port 174A at one end of the first shift actuator assembly 46A which includes a cylinder or housing 174 and a piston 176 which is connected to the first shift rail and fork assembly 44A. In this embodiment, the first actuator assembly 46A and the first shift rail and fork assembly 44A are associated with first and third gears. A port 174B at the other end of the cylinder 174 of the first shift actuator assembly 46A communicates through a line 178 to a third outlet port 150H. A second outlet port 150I communicates through a line 182 to a port 184A at one end of the second shift actuator assembly 56A which includes a housing or cylinder 184 and a piston 186 which is connected to the second shift rail and fork assembly 54A. In this embodiment, the second shift actuator assembly 56A and the second shift rail and fork assembly 54A are associated with fifth and seventh gears. A port 184B at the other end of the cylinder 184 of the second shift actuator assembly 56A communicates through a line 188 to a fourth outlet port 150J. It should be understood that the hydraulic lines and the shift actuators may be in any order or arrangement as long as system operation and functionality are maintained.

Turning now to operation of the portion of the transmission 10 associated with the first layshaft or countershaft 24A and the odd-numbered gears, to engage an odd-numbered gear, hydraulic fluid must flow through the first electric pressure control solenoid valve 140 by energizing and opening the pressure control solenoid valve 140. The two position solenoid valve 152 is de-energized so that the spool of the first logic valve 150 is to the right, in the position illustrated in FIG. 2A, and thus the second shift actuator assembly 56A is inactive. Pressurized hydraulic fluid enters the inlet port 150B and exits the third outlet port 150H, moving through the line 178 to the port 174B and translates the piston 176 of the first shift actuator assembly 46A to the left to engage, for example, third gear.

To engage, for example, first gear, the first pressure or flow control solenoid valve 144 is energized, providing pressurized hydraulic fluid to the first inlet port 150A, through the spool or logic valve 150, out the first outlet port 150G, through the line 172 to the port 174A of the first shift actuator assembly 46A, thereby translating the piston 176 and the first shift rail and fork assembly 44A in the opposite direction. Once either first or third gear has been selected and engaged, the electric pressure or flow clutch control solenoid valve 154 is energized to provide pressurized hydraulic fluid to the first clutch piston and cylinder assembly 160 to engage the first clutch 22A. To neutralize first or third gears on the first shift actuator assembly 46A, a flow or pressure is commanded by the first control solenoid valve 144 to control the position of the first shift actuator assembly 46A using feedback from the first linear position sensor 48A or by commanding a pressure or flow from a positive neutral valve (not illustrated).

To engage the other two odd numbered gears, fifth and seventh gears, the two position solenoid valve 152 is energized, providing pressurized hydraulic fluid to the outlet port 152B and to the control port 150C at the end of the first logic valve 150. The spool of the first logic valve 150 translates to its second position, to the left in FIG. 2A. The first shift actuator assembly 46A is now inactive. Now pressurized hydraulic fluid from the inlet port 150B exits the first logic valve 150 through the fourth outlet port 150J, travels through the line 188 to the port 184B and translates the piston 186 to the left, as illustrated in FIG. 2A, to engage seventh gear.

To engage, for example, fifth gear, the electric pressure or flow control solenoid valve 144 is energized, providing pressurized hydraulic fluid to the first inlet port 150A, through the spool or logic valve 150, out the second outlet port 150I, through the line 182, which enters the port 184A of the cylinder 184 and translates the piston 186 and the second shift rail 66A to the right. Once either fifth or seventh gear has been selected and engaged, the electric pressure or flow clutch control solenoid valve 154 may be energized to provide pressurized hydraulic fluid to the first clutch piston and cylinder assembly 160 to engage the first clutch 22A. To neutralize fifth or seventh gears on the second shift actuator assembly 56A, a flow or pressure is commanded by the first pressure or flow control solenoid valve 144 to control the position of the second shift actuator assembly 56A using feedback from the second linear position sensor 58A or by commanding a pressure or flow from a positive neutral valve (not illustrated).

Returning now to the second main supply line 126B, it communicates with an inlet port 190A of a second electric pressure control solenoid valve 190 for the second gearbox, i.e., the other half of the transmission 10 associated with the second layshaft or countershaft 24B which provides, for example, the even-numbered gears: second, fourth, sixth and reverse. The second pressure control solenoid valve 190 also includes an outlet port 190B that communicates with the inlet port 190A when the second control valve 190 is activated or energized and an exhaust port 190C that communicates with the outlet port 190B when the second control valve 190 is inactive or de-energized. The exhaust port 190C is connected to the sump 102. The outlet port 190B communicates with a second manifold 192 having five branches. A first branch 192A of the second manifold 192 communicates with an inlet port 194A of a second electric pressure or flow control solenoid valve 194. When the second pressure or flow control valve 194 is activated or energized, the inlet port 194A is in fluid communication with an outlet port 194B; when the second pressure or flow control valve 194 is inactive or de-energized, the outlet port 194B is in fluid communication with an exhaust port 194C. The outlet port 194B is connected through a line 196 having a flow restricting orifice 198 to a first inlet port 200A of a second two position spool or logic valve 200.

A second branch 192B of the second manifold 192 leads directly to a second inlet port 200B of the second logic valve 200. The second logic valve 200 also includes three exhaust ports 200D, 200E and 200F interleaved with the inlet port 200A and the inlet port 200B. The three exhaust ports 200D, 200E and 200F communicate with the sump 102, although the lines, for reasons of clarity, are not illustrated. A third branch 192C of the second manifold 192 connects to an inlet port of 202A of a second two position (on-off) solenoid valve 202. The outlet port 202B of the second two position solenoid valve 202 communicates with a control port 200C at the end of the second logic valve 200. When the second two position solenoid valve 202 is activated or energized, pressurized hydraulic fluid is supplied to the control port 200C, translating the spool of the second logic valve 200 to the left. When the second two position solenoid valve 202 is inactive or de-energized, hydraulic fluid is exhausted from the second logic valve 200, through the outlet port 202B and out an exhaust port 202C to the sump 102, allowing the spool to translate to the right, as illustrated in FIG. 2B. A fourth branch 192D of the second manifold 192 communicates with an inlet port 204A of a second electric pressure or flow clutch control solenoid valve 204. The second clutch control solenoid valve 204 also includes an outlet port 204B and an exhaust port 204C which communicates with the sump 102.

When the second clutch control solenoid valve 204 is activated or energized, pressurized hydraulic fluid is provided through an orifice 206 in a line 208 to a second clutch piston and cylinder assembly 210. Slidably disposed within a cylinder 212 is a single acting piston 214 which translates under hydraulic pressure to the right in FIG. 2B, to engage the second input clutch 22B, illustrated in FIG. 1A. When the second clutch control solenoid valve 204 is inactive or de-energized, the inlet port 204A is closed off and hydraulic fluid from the cylinder 212 passes from the outlet port 204B to the exhaust port 204C and into the sump 102. A fifth branch 192E of the second manifold 192 communicates with the output of a clutch pressure limit control valve 216. If pressure within the second clutch piston and cylinder assembly 210 exceeds a predetermined pressure supplied by the pressure control solenoid 190, then the pressure limit control valve 216 opens to relieve and reduce the pressure.

Returning now to the second spool or logic valve 200, it also includes a first outlet port 200G which communicates through a line 222 to a port 224A at one end of the third shift actuator assembly 46B which includes a cylinder or housing 224 and a piston 226 which is connected to the third shift rail and fork assembly 44B. In this embodiment, the third shift actuator assembly 46B and the third shift rail and fork assembly 44B are associated with second and fourth gears. A port 224B at the other end of the cylinder 224 of the third shift actuator assembly 46B communicates through a line 228 to a third outlet port 200H. A second outlet port 200I communicates through a line 232 to a port 234A at one end of the fourth shift actuator assembly 56B which includes a housing or cylinder 234 and a piston 236 which is connected to the fourth shift rail and fork assembly 54B. In this embodiment, the fourth shift actuator assembly 56B and the fourth shift rail and fork assembly 54B are associated with sixth and reverse gears. A port 234B at the other end of the cylinder 234 of the fourth shift actuator assembly 56B communicates through a line 238 to a fourth outlet port 200J.

Turning now to operation of the portion of the transmission 10 associated with the second layshaft or countershaft 24B and the even-numbered gears: to engage an even-numbered gear, hydraulic fluid must flow through the second electric pressure control solenoid valve 190 which is energized and open while the first electric pressure control solenoid valve 140 is de-energized such that no action or activity may occur with regard to the portion of the transmission 10 associated with the first countershaft 24A and the selection of odd-numbered gears described above. The two position solenoid valve 202 is de-energized so that the spool of the second logic valve 200 is to the right, as illustrated in FIG. 2B, and thus the fourth shift actuator assembly 56B is inactive. Pressurized hydraulic fluid enters the inlet port 200B and exits the third outlet port 200H, moving through the line 228 to the port 224B and translates the piston 226 to the left to engage, for example, fourth gear.

To engage, for example, second gear, the electric pressure or flow control solenoid valve 194 is energized, providing pressurized hydraulic fluid to the first inlet port 200A, through the spool or logic valve 200, out the first outlet port 200G, through the line 222 to the port 224A of the third shift actuator assembly 46B, thereby translating the piston 226 and the third shift rail and fork assembly 44B in the opposite direction. Once either second or fourth gear has been selected and engaged, the electric pressure or flow clutch control solenoid valve 204 is energized to provide pressurized hydraulic fluid to the second clutch piston and cylinder assembly 210 to engage the second clutch 22B. To neutralize second or fourth gears on the third actuator assembly 46B, a flow or pressure is commanded by the second pressure or flow control solenoid valve 194 to control the position of the third actuator assembly 46B using feedback from the third linear position sensor 48B or by commanding a flow or pressure from a positive neutral valve (not illustrated).

Engagement of sixth and reverse gears is similarly achieved with the activation of the two position solenoid valve 202 which effects translation of the spool of the second logic valve 200 to the left, thereby providing hydraulic fluid to the fourth shift actuator assembly 56B and terminating all pressurized fluid flow to the third shift actuator assembly 46B. Reverse is achieved with the second pressure or flow control valve 194 de-energized such that pressurized hydraulic fluid flows through the line 238 translating the piston 236 and associated components to the left. Sixth gear is engaged through translation of the piston 236 to the right which is achieved by energization of the second pressure or flow control valve 194. Once either sixth or reverse gear has been selected and engaged, the electric pressure or flow clutch control solenoid valve 204 is energized to provide pressurized hydraulic fluid to the second clutch piston and cylinder assembly 210 to engage the second clutch 22B. To neutralize sixth or reverse gears on the fourth shift actuator assembly 56B, a flow or pressure is commanded by the second pressure or flow control solenoid valve 194 to control the position of the fourth actuator assembly 56B using feedback from the fourth linear position sensor 58B or by commanding a flow or pressure from a positive neutral valve (not illustrated).

Figure 3A:
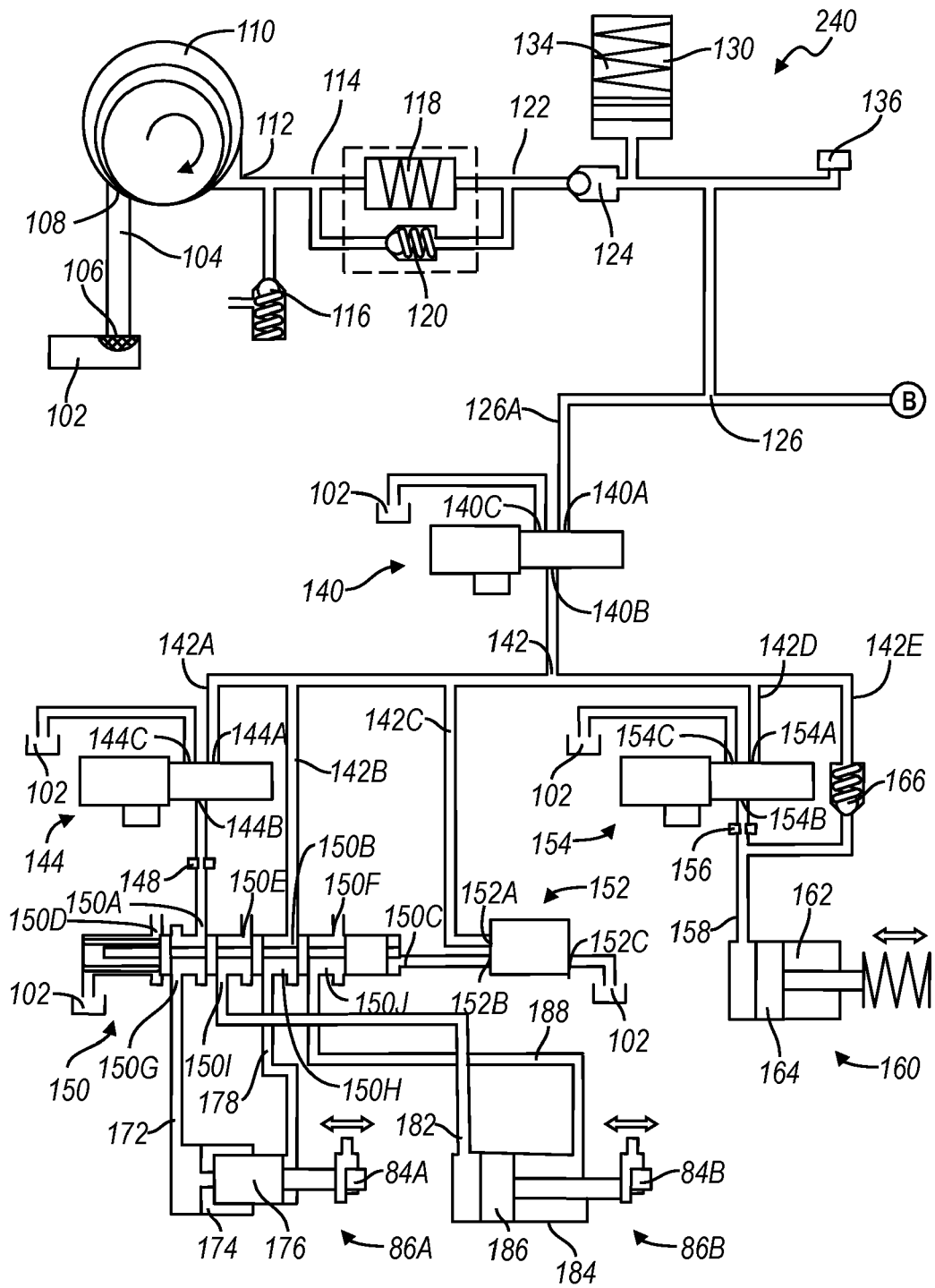
FIGS. 3A and 3B are schematic flow diagrams of a second embodiment of a hydraulic control system according to the present invention for a dual clutch automatic transmission.
Figure 3B:
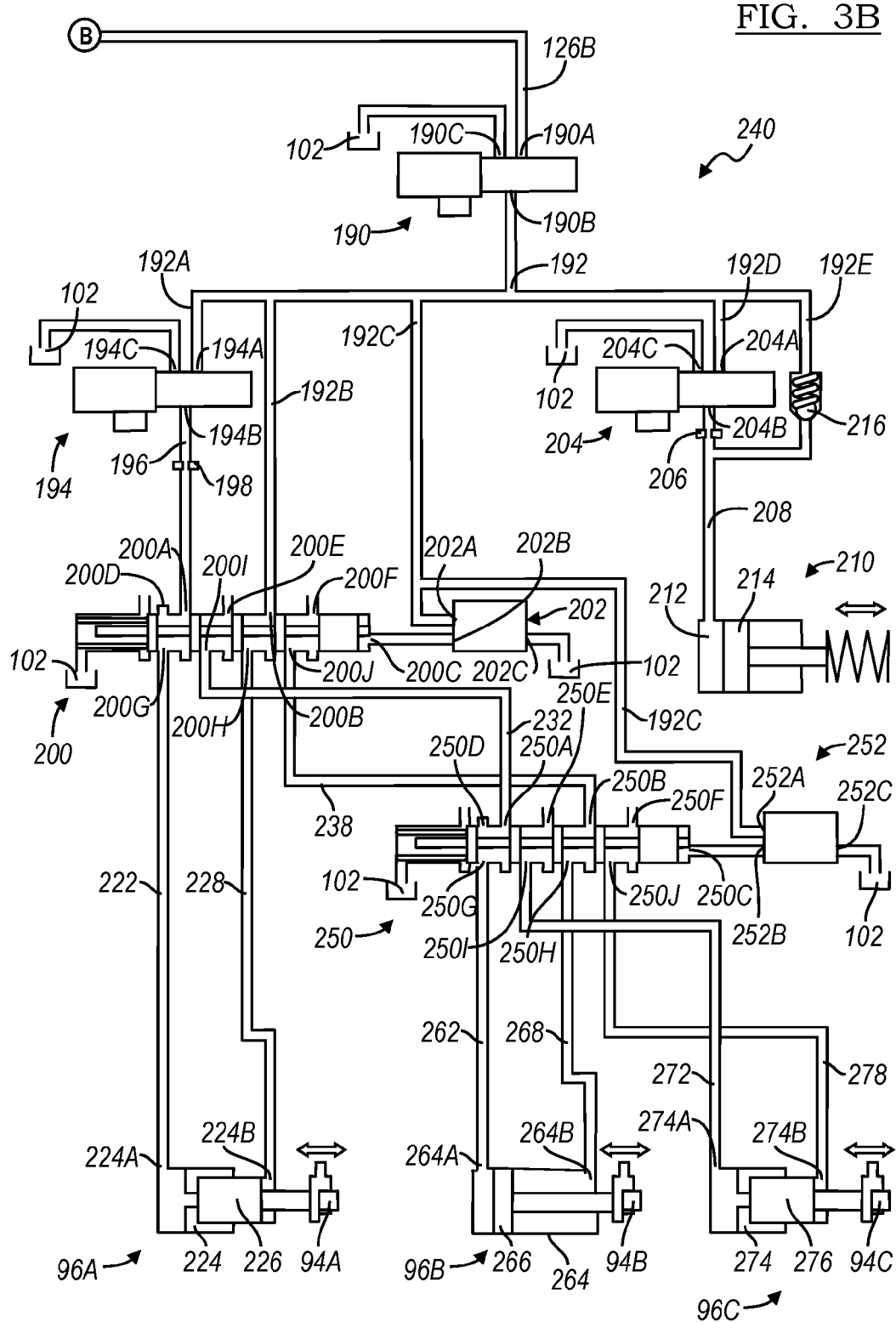

Referring now to FIGS. 1B, 3A and 3B, a second embodiment of a hydraulic control system for the dual clutch automatic transmission 60 described above with reference to FIG. 1B is illustrated and designated by the reference number 240. Inspection of the second embodiment of the hydraulic control system 240 reveals that the hydraulic supply components such as the pump 110, the valves 116, 120 and 124 and the accumulator 130 are the same as those utilized in the first embodiment control system 100. Accordingly, further details of these components may be found in the above description which is hereby incorporated by reference.

The second embodiment of the hydraulic control system 240 differs from the hydraulic control system 100 in that three actuators providing three positions (left, center and right) are utilized with certain gears and two actuators providing two positions (left and right) are utilized with other gears. It should be understood that either two position or three position actuators may be utilized in the present invention with appropriate feedback and control. The portion of the hydraulic control system 240 illustrated in FIG. 3A is thus similar to that illustrated in FIG. 2A and includes the first pressure control solenoid valve 140, the first pressure or flow control solenoid valve 144, the first spool or logic valve 150, the first two position solenoid valve 152, the first shift actuator assembly 86A and the second shift actuator assembly 86B. It is distinct in that it relates only to the even-numbered gears and includes one three position actuator assembly 86A and one two position actuator assembly 86B.

For example, and depending upon the configuration and layout of the transmission 60, the first shift actuator assembly 86A may engage second and sixth gears while the second shift actuator assembly 86B may engage only fourth gear. When the first clutch control solenoid valve 154 is energized, pressurized hydraulic fluid is provided through the orifice 156 in the line 158 to the first clutch piston and cylinder assembly 160. Slidably disposed within the cylinder 162 is the single acting piston 164 which translates to the right in FIG. 3A under hydraulic pressure to engage the first input clutch 64B, illustrated in FIG. 1B.

Turning then to FIG. 3B and the hydraulic components associated with the odd-numbered gears and reverse, the second main supply line 126B communicates with the inlet port 190A of the second electric pressure control solenoid valve 190. The second pressure control solenoid valve 190 includes the outlet port 190B that communicates with the inlet port 190A when the second control valve 190 is energized and the exhaust port 190C that communicates with the outlet port 190B when the second control valve 190 is de-energized. The exhaust port 190C is connected to the sump 102. The outlet port 190B communicates with the second manifold 192 having five branches. The first branch 192A communicates with the inlet port 194A of the second electric pressure or flow control solenoid valve 194. When the second pressure or flow control valve 194 is energized, the inlet port 194A is in fluid communication with the outlet port 194B; when the second pressure or flow control valve 194 is de-energized, the outlet port 194B is in fluid communication with the exhaust port 194C. The outlet port 194B is connected through the line 196 having the flow restricting orifice 198 to the first inlet port 200A of the second two position spool or logic valve 200.

The second branch 192B of the second manifold 192 communicates with the second inlet port 200B of the second logic valve 200. The second spool or logic valve 200 also includes the three exhaust ports 200D, 200E and 200F interleaved with the inlets ports 200A and 200B. The third branch 192C of the second manifold 192 connects to the inlet port of 202A of the second two position (on-off) solenoid valve 202. The outlet port 202B of the second two position solenoid valve 202 communicates with the control port 200C at the end of the second logic valve 200. When the second two position solenoid valve 202 is energized, pressurized hydraulic fluid is supplied to the control port 200C, translating the spool of the second logic valve 200, to the left as illustrated in FIG. 3B. When the second two position solenoid valve 202 is de-energized, hydraulic fluid is exhausted from the second logic valve 200, through the outlet port 202B and out the exhaust port 202C to the sump 102, allowing the spool to translate to the right. The fourth branch 192D of the second manifold 192 communicates with the inlet port 204A of the second electric pressure or flow clutch control solenoid valve 204. The second clutch control solenoid valve 204 also includes the outlet port 204B and the exhaust port 204C which communicates with the sump 102.

When the second clutch control solenoid valve 204 is energized, pressurized hydraulic fluid is provided through the orifice 206 in the line 208 to the second clutch piston and cylinder assembly 210. Slidably disposed within the cylinder 212 is the single acting piston 214 which translates under hydraulic pressure to the right in FIG. 3B to engage the second input clutch 64B, illustrated in FIG. 1B. When the second clutch control solenoid valve 204 is de-energized, the inlet port 204A is closed off and hydraulic fluid from the cylinder 212 passes from the outlet port 204B to the exhaust port 204C and into the sump 102. The fifth branch 192E of the second manifold 192 communicates with the output of the clutch pressure limit control valve 216. If pressure within the second clutch piston and cylinder assembly 210 exceeds a predetermined pressure supplied by the pressure control solenoid 190, the pressure limit control valve 216 opens to relieve and reduce the pressure.

The second spool or logic valve 200 also includes the first outlet port 200G which communicates through the line 222 to the port 224A at one end of the third shift actuator assembly 96A which includes the cylinder or housing 224 and the piston 226 which is connected to the third shift rail and fork assembly 94A. In this embodiment, the third actuator assembly 96A is a three position actuator and the third shift rail and fork assembly 94A may be associated with fifth and seventh gears. The port 224B at the other end of the cylinder 224 of the third shift actuator assembly 96A communicates through the line 228 to the third outlet port 200H.

The line 232 communicating with the second outlet port 200I of the second logic valve 200 is connected to a first inlet port 250A of a third spool or logic valve 250. The line 238 communicating with the fourth outlet port 200J of the second logic valve 200 is connected to a second inlet port 250B of the third spool or logic valve 250. Three exhaust ports 250D, 250E and 250F are interleaved with the first inlet port 250A and the second inlet port 250B. The three exhaust ports 250D, 250E and 250F communicate with the sump 102 although, for reasons of clarity, such connections are not illustrated. The third spool or logic valve 250 also includes a control port 250C at one end that communicates with an outlet port 252B of a third two position (on-off) solenoid valve 252. The third two position solenoid valve 252 includes an inlet port 252A which is in fluid communication with the third branch 192C of the second manifold 192 and an exhaust port 252C which communicates with the sump 102.

A first outlet port 250G communicates through a line 262 to a port 264A at one end of the fourth shift actuator assembly 96B which includes a cylinder or housing 264 and a piston 266 which is connected to the fourth shift rail and fork assembly 94B. In this embodiment, the fourth shift actuator assembly 96B is a two position type and engages only third gear. A port 264B at the other end of the cylinder 264 of the fourth actuator assembly 96B communicates through a line 268 to a third outlet port 250H.

When the third two position (on-off) solenoid valve 252 is not energized, hydraulic fluid flows through the first and third outlet ports 250G and 250H, as described, selecting third gear. When the third two position (on-off) solenoid valve 252 is energized, the spool of the third logic valve 250 translates to the left, as illustrated in FIG. 3B, and pressurized hydraulic fluid flows through the second outlet port 250I in a line 272 to a port 274A at one end of the fifth shift actuator assembly 96C which includes a cylinder or housing 274 and a piston 276 which is connected to the fifth shift rail and fork assembly 94C. A port 274B at the other end of the cylinder or housing 274 communicates with a fourth outlet port 250J through a line 278. The fifth shift actuator assembly 90C is a three position type and engages either first or reverse gear.

Figure 4A:
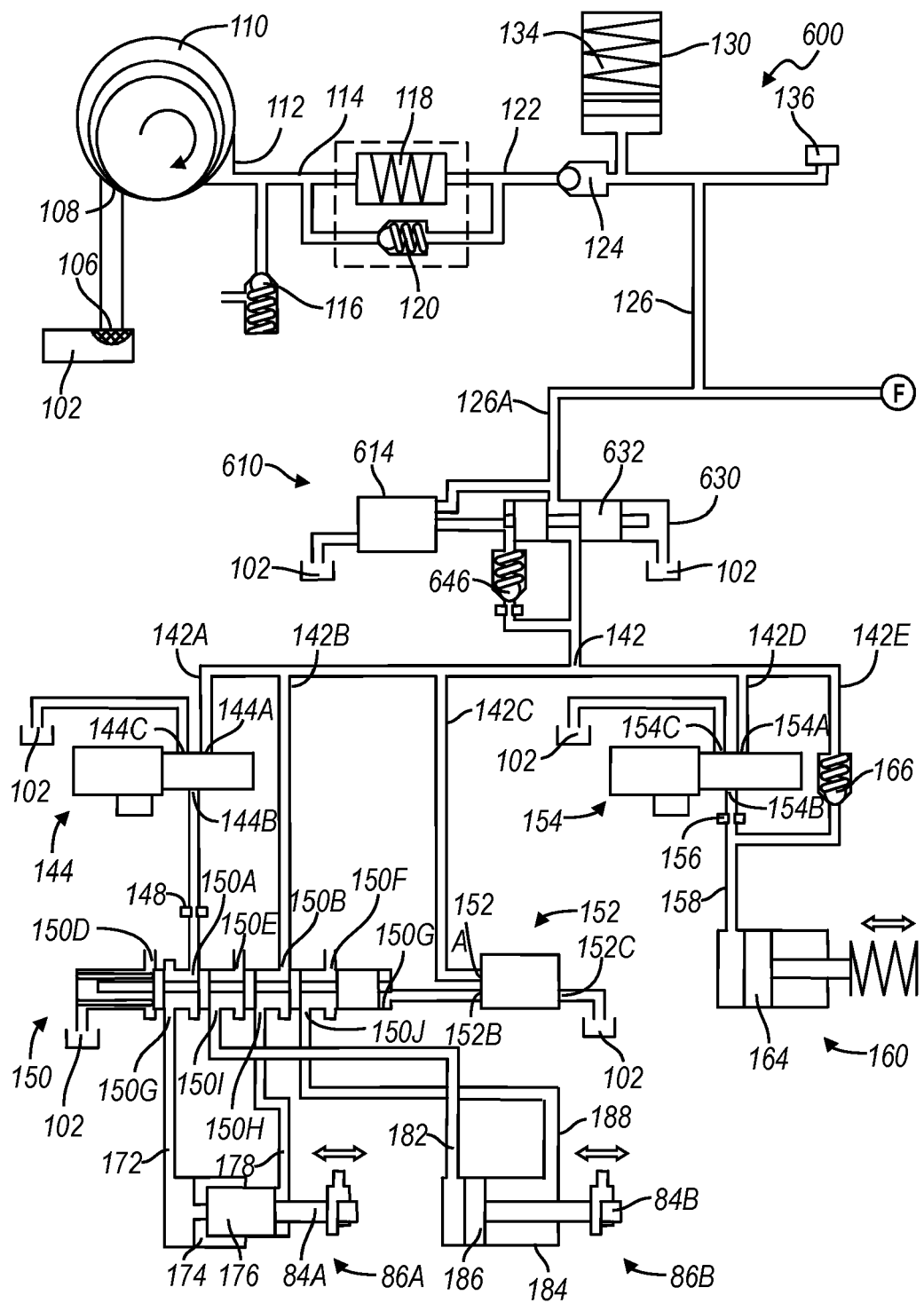
FIGS. 4A and 4B are schematic flow diagrams of a third embodiment of a hydraulic control system according to the present invention for a dual clutch automatic transmission.
Figure 4B:
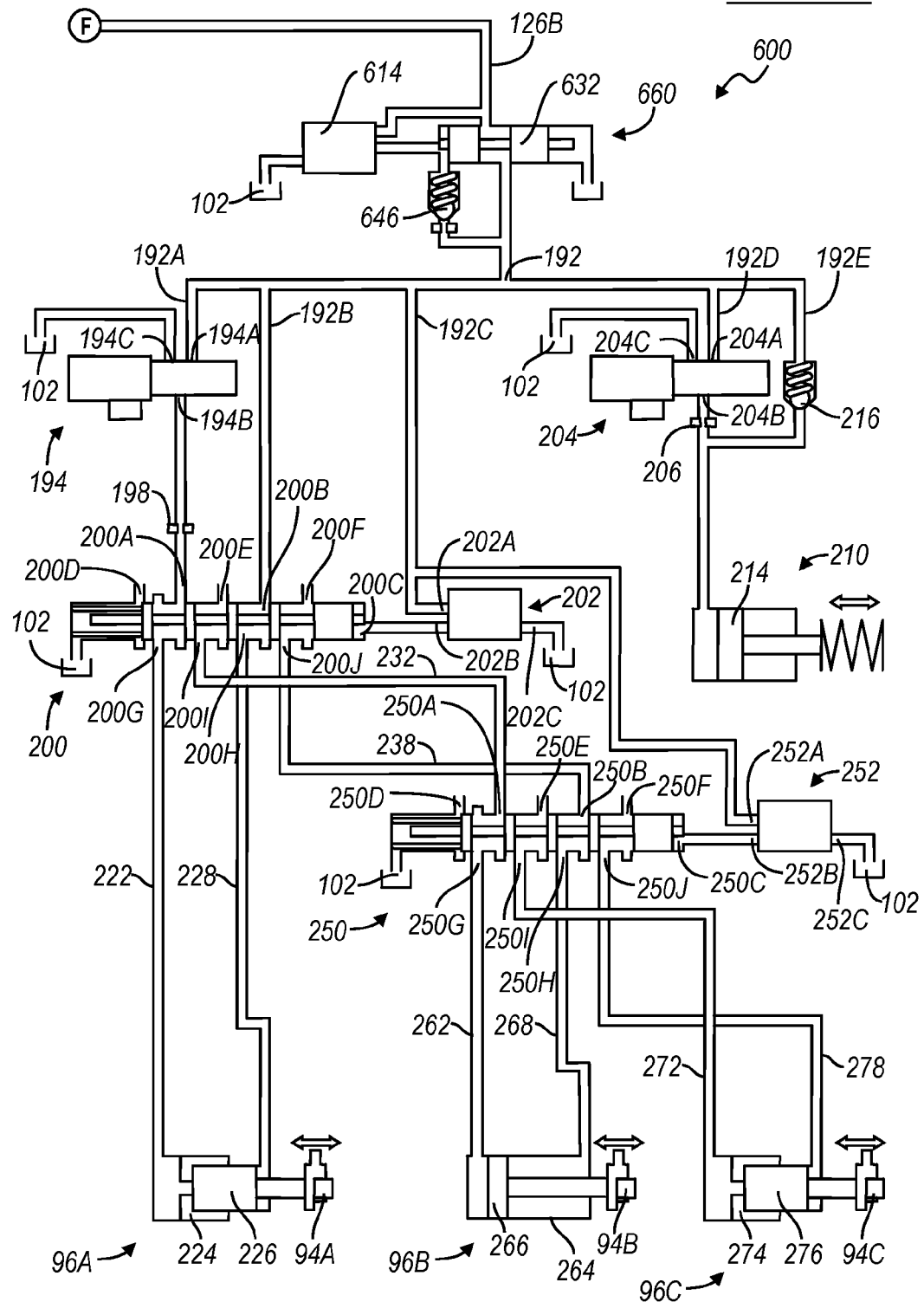

Referring now to FIGS. 1B, 4A and 4B, a third embodiment of a hydraulic control system according to the present invention is illustrated and generally designated by the reference number 600. The third embodiment 600 of the hydraulic control system, as stated, includes, in common with the other two embodiments, the electric pump 110, the filters 106 and 118, the accumulator 130 and the other components of the hydraulic fluid supply and they will thus not be further described. Furthermore, those components associated with the first branching manifold 142 including the first pressure or flow control solenoid valve 144, the first spool or logic valve 150, the first two position solenoid valve 152 and the associated pistons 176 and 186 and cylinders 174 and 184 are the same as the second embodiment 240 illustrated in FIG. 3A. Similarly, those components associated with the second branching manifold 192 including the second pressure or flow control solenoid valve 194, the second spool or logic valve 200, the third spool or logic valve 250, the two position solenoid valves 202 and 252, and the associated pistons 226, 266 and 276 and cylinders 224, 264 and 274 are the same as the second embodiment 240 illustrated in FIGS. 3A and 3B.

Finally, the components associated with activation of the first clutch 64A, such as the first electric pressure or flow clutch control solenoid valve 154 and the first clutch piston and cylinder assembly 160, as well as the components associated with activation of the second clutch 64B, such as the second electric pressure or flow clutch control solenoid valve 204 and the second clutch piston and cylinder assembly 210, are the same as in the previously described embodiments. Thus such components will not be further described.

The differences between the second embodiment 240 illustrated in FIGS. 3A and 3B and the third embodiment 600 illustrated in FIGS. 4A and 4B involve the first pressure control solenoid valve 140 disposed between the first main supply line 126A and the first manifold 142 and the second pressure control solenoid valve 190 disposed between the second main supply line 126B and the second manifold 192. In the third embodiment 600 of the hydraulic control system, the pressure control solenoid valves 140 and 190 have been replaced by a first feed limit valve assembly 610 and a second feed limit valve assembly 660, respectively. Since the feed limit valve assemblies 610 and 660 are identical, only the first feed limit valve assembly 610 will be described.

Figure 4C:
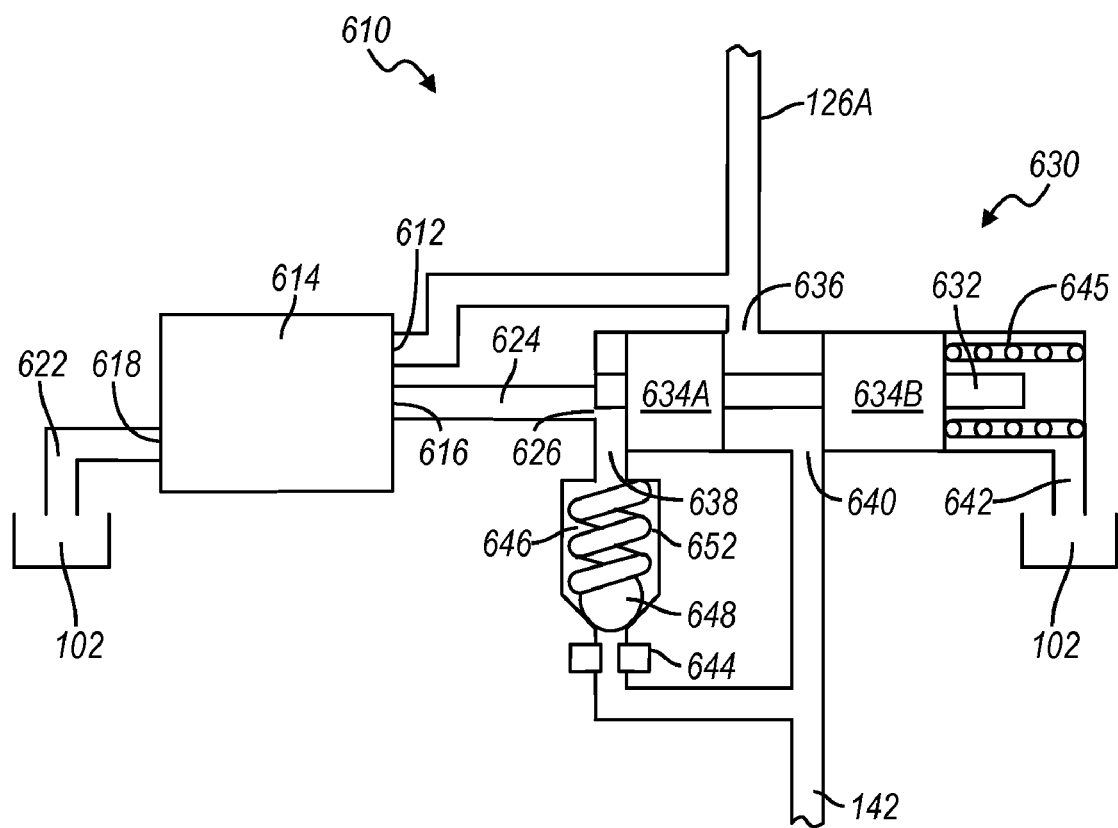
FIG. 4C is an enlarged, diagrammatic view of a feed limit valve with flow cut-off incorporated in a hydraulic control system according to the third embodiment of the present invention.

Referring now to FIG. 4C, the first feed limit valve assembly 610 receives pressurized hydraulic fluid in the first main supply line 126A. The line 126A bifurcates and one branch communicates with an inlet port 612 of a two position (on-off) solenoid valve 614. The solenoid valve 614 includes an outlet port 616 which is in fluid communication with the inlet port 612 when the solenoid valve 614 is energized. The solenoid valve 614 also includes an exhaust port 618 which connects to the sump 102 through a line 622. When the solenoid valve 614 is de-energized, the outlet port 616 is in fluid communication with the exhaust port 618.

The outlet port 616 of the solenoid valve 614 is connected by a line 624 to a first control port 626 of a five port spool or control valve 630. The control valve 630 includes a spool 632 having two spaced-apart pistons or lands 634A and 634B. The following ports provide oil around and to the control valve 630: the first control port 626, a first inlet port 636 which is connected to the first main supply line 126A, a second control port 638, an outlet port 640 and an exhaust port 642 which communicates with the sump 102. A compression spring 645 which biases the spool 632 toward the first control port 626 is disposed within the logic control valve 630 proximate the exhaust port 642.

The first outlet port 640 is connected to and communicates with the first manifold 142 and, through a flow restricting orifice 644, and a check valve 646 having, for example, a check ball 648 and a compression spring 652, with the second control port 638. The compression spring 652 biases the check ball 648 toward the orifice 644 such fluid flow from the second control port 638 to the first manifold 142 is prohibited but fluid flow from the first manifold 142 to the second control port 638 is possible if the pressure differential across the check ball 648 is high enough to overcome the bias of the compression spring 652. Depending upon operational conditions and considerations, the compression spring 652 may be omitted without operational degradation.

In operation, the first feed limit valve assembly 610 provides improved flow and pressure control to the other components of the hydraulic control system. In its relaxed state, as illustrated in FIG. 4C, flow from the main supply line 126A passes through the control valve 630 between the lands 634A and 634B and out to the first manifold 142. As hydraulic pressure in the system builds as, for example, actuators move and fill, the pressure will increase at the end of the check valve 646, unseating it and hydraulic fluid will flow to the control port 626. This action translates the valve spool 632 to the right, closing off flow to the inlet port 636 or the outlet port 640 (depending on valve design) and the first manifold 126 or 142. Thus, the pressure delivered to the first manifold 142 can be controlled. Additionally, if the side of the transmission 60 associated with the control valve 610 is to be inoperative, for example, while the other side of the transmission 60 is operating, the solenoid valve 614 is energized to provide hydraulic fluid from the first main supply line 126A to the first control port 626 to translate the valve spool 632 to the right to close off fluid flow between the inlet port 636 and the outlet port 640. In this operating mode, the check valve 646 prevents the fluid pressure provided to the first and second control ports 626 and 638 from being communicated to the first manifold 142 and the other components of the system.

It will be appreciated that the hydraulic control systems according to various embodiments of the present invention achieve significant improvements in reduced energy consumption and shift performance not only because of the incorporation of the dedicated electric pump and accumulator but also because of the use of pressure and flow control solenoid valves which allow the majority of the hydraulic system components to be turned off in normal, steady-state, operation. Additionally, these solenoid valves and the linear position sensors on each piston and cylinder shift actuator assembly which provide real time data to the transmission control module regarding the instantaneous positions of the actuators, shift rails and clutches, achieve gear selection and clutch operation that is rapid, positive and efficient without overshoot and wasted energy.

Similarly, the configurations of the various embodiments and the position feedback provided by the linear position sensors permits and facilitates rapid gear sequencing and improved, i.e., reduced, shift times.

Finally, the separation of hydraulic fluid supply and control functions into two regions or sections corresponding generally to the odd and even gear selecting portions of the transmissions, reduces the likelihood of inaccurate or multiple gear selection and further improves efficiency by permitting shutting down the non-active region or section of the transmission during certain operating situations such as extended operation in the highest gear. The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch transmission comprising, in combination,
    a source of pressurized hydraulic fluid including a pump,
    a pair of pressure control solenoid valves having inputs communicating with said source of hydraulic fluid and a first output and second output independent of said first output,
    a pair of clutch actuator assemblies each in fluid communication with one of said outputs and including a piston and cylinder assembly and a solenoid valve for selectively supplying hydraulic fluid to said piston and cylinder assembly,
    a pair of pressure or flow control solenoid valves, one of said pair of valves having a first inlet connected to said first output and having a third output and another of said pair of valves having a second inlet connected to said second output and having a fourth output,
    a first logic valve having a first inlet connected to said third output and a second inlet connected to said first output, a plurality of exhaust ports, a control port, a first outlet, a second outlet, a third outlet and a fourth outlet,
    a first gear selection piston and cylinder assembly having a first port connected to said first outlet of said first logic valve and a second port connected to said to said third outlet of said first logic valve,
    a second gear selection piston and cylinder assembly having a first port connected to said second outlet of said first logic valve and a second port connected to said to said fourth outlet of said second logic valve,
    a second logic valve having a first inlet connected to said fourth output, a second inlet connected to said second output, a plurality of exhaust ports, a control port, a first outlet, a second outlet, a third outlet and a fourth outlet,
    a third gear selection piston and cylinder assembly having a first port connected to said first outlet of said second logic valve and a second port connected to said to said third outlet of said second logic valve, and
    a fourth gear selection piston and cylinder assembly having a first port connected to said second outlet of said second logic valve and a second port connected to said to said fourth outlet of said second logic valve.

2. The hydraulic control system of claim 1 further including a first two position solenoid valve operably disposed between said first output and said control port of said first logic valve and a second two position solenoid valve operably disposed between said second output and said control port of said second logic valve.

3. The hydraulic control system of claim 1 further including a position sensor operably associated with each of said gear selection piston and cylinder assemblies.

4. The hydraulic control system of claim 1 further including a transmission control module having a plurality of inputs and outputs, said outputs operably coupled to said valves and a position sensor for sensing the position of each of said gear selection piston and cylinder assemblies and having an output coupled to one of said control module inputs.

5. The hydraulic control system of claim 1 wherein said logic valves each include a valve spool having a plurality of lands.

6. The hydraulic control system of claim 1 further including a flow restricting orifice disposed between said outputs of said pressure or flow control solenoid valves and said first inlets of said logic valves.

* * * * *